(12) United States Patent
Hoffmann (10) Patent No.: US 11,554,867 B2
(45) Date of Patent: Jan. 17, 2023

(54) MULTI-PURPOSE SHORING ADAPTER

(71) Applicant: CARGOLUX AIRLINES INTERNATIONAL S.A., Sandweiler (LU)

(72) Inventor: Paul Hoffmann, Rumelange (LU)

(73) Assignee: CARGOLUX AIRLINES INTERNATIONAL S.A., Sandweiler (LU)

( * ) Notice: Subject to any disclaimer, the term of this patent is extended or adjusted under 35 U.S.C. 154(b) by 333 days.

(21) Appl. No.: 16/763,302

(22) PCT Filed: Nov. 20, 2018

(86) PCT No.: PCT/EP2018/081929
§ 371 (c)(1),
(2) Date: May 12, 2020

(87) PCT Pub. No.: WO2019/101741
PCT Pub. Date: May 31, 2019

(65) Prior Publication Data
US 2020/0307793 A1 Oct. 1, 2020

(30) Foreign Application Priority Data
Nov. 24, 2017 (LU) .................................. LU100523

(51) Int. Cl.
*B64D 9/00* (2006.01)
*B65D 19/44* (2006.01)

(52) U.S. Cl.
CPC ............... *B64D 9/00* (2013.01); *B65D 19/44* (2013.01); *B65D 2519/00766* (2013.01); *B65D 2519/00815* (2013.01)

(58) Field of Classification Search
CPC .... B64D 9/00; B64D 9/003; B64D 2009/006; B64C 1/20; B60P 7/16; B60P 7/18; B60P 7/13
(Continued)

(56) References Cited

U.S. PATENT DOCUMENTS

| | | | |
|---|---|---|---|
| 3,163,127 A | 12/1964 | Gutridge et al. | |
| 4,929,133 A * | 5/1990 | Wiseman | B64C 1/20 410/67 |

(Continued)

FOREIGN PATENT DOCUMENTS

BE  566915 A  8/1960

OTHER PUBLICATIONS

International Search Report dated Jan. 7, 2019 re: Application No. PCT/EP2018/081929, pp. 1-4, citing: U.S. Pat. No. 9,738,402 B2, BE 566 915 A and U.S. Pat. No. 3,163,127 A.
(Continued)

*Primary Examiner* — Stephen T Gordon
(74) *Attorney, Agent, or Firm* — Cantor Colburn LLP (57) ABSTRACT

A shoring adapter configured for spreading cargo loads, in particular heavy cargo loads, to be loaded on board of a transport aircraft, includes at least one base portion configured to be placed on a standardized aircraft cargo pallet and a cargo adapter portion configured to accommodate the cargo load. In operation, the cargo adapter portion is mounted on top of the at least one base portion. The at least one base portion includes a lower frame assembly, an upper frame assembly and at least one elastic support assembly. The at least one elastic support assembly is arranged between the lower and upper frame assemblies such that, in operation, the upper frame assembly is elastically supported in a vertical direction by the at least one elastic support assembly on the lower frame assembly.

12 Claims, 4 Drawing Sheets

(58) Field of Classification Search
USPC .................................. 410/46, 52, 87, 88, 155
See application file for complete search history.

(56) References Cited

U.S. PATENT DOCUMENTS

| | | | | |
|---|---|---|---|---|
| 5,865,579 | A * | 2/1999 | Thomas | ................... B60P 7/13 |
| | | | | 410/67 |
| 7,118,314 | B2 * | 10/2006 | Zhou | ................. B65D 19/0034 |
| | | | | 410/46 |
| 9,738,402 | B2 | 8/2017 | Brown | |
| 10,040,601 | B2 * | 8/2018 | Noe | .......................... B60P 7/18 |
| 2012/0025027 | A1 * | 2/2012 | Yandle | .................... B64D 1/14 |
| | | | | 410/87 |

OTHER PUBLICATIONS

Written Opinion dated Jan. 7, 2019 re: Application No. PCT/EP2018/081929, pp. 1-6, citing: U.S. Pat. No. 9,738,402 B2.

* cited by examiner

Fig. 1 (prior art)

Longitudinal pyramid shoring

MULTI-PURPOSE SHORING ADAPTER

TECHNICAL FIELD

The present disclosure generally relates to a shoring adapter for load spreading of air cargo and more particularly to a shoring adapter used to spread heavy cargo loads on board of civil transport aircraft.

BACKGROUND

It is a legal requirement for aircraft operators to ensure that all aircraft limitations are not exceeded during operation. The European Union regulations specifying minimum safety and related procedures for commercial passenger and cargo fixed-wing aviation, EASA AIR OPS, specifies more exactly that "An operator must comply with additional structural limits such as the floor strength limitations, the maximum load per running metre, the maximum mass per cargo compartment, and/or the maximum seating limits . . . " (CAT POL MAB.100 (Commercial Air Transport Performance Operating Limitations Mass and Balance)/Mass and Balance—General, (c) Aeroplane loading).

Currently, the methods that are used to spread heavy cargo loads on board of civil transport aircraft are based on SAE document ARP5596. This document outlines the standard industry methods to calculate and perform shoring (load spreading) that is required on board of civil transport aircraft whenever a piece of cargo to be carried exceeds the aircraft's maximum allowable limits in area load, running load of both. It provides . . . the engineering methods needed to properly design a shoring arrangement.

This SAE document and the methods described within are used as a baseline for the aircraft type specific shoring manuals, such as e.g. "Boeing Shoring Guidelines for outsized Cargo" D043U325-01 (Boeing B747-8F), D6-35527 (Boeing B747-400).

Figure 1:
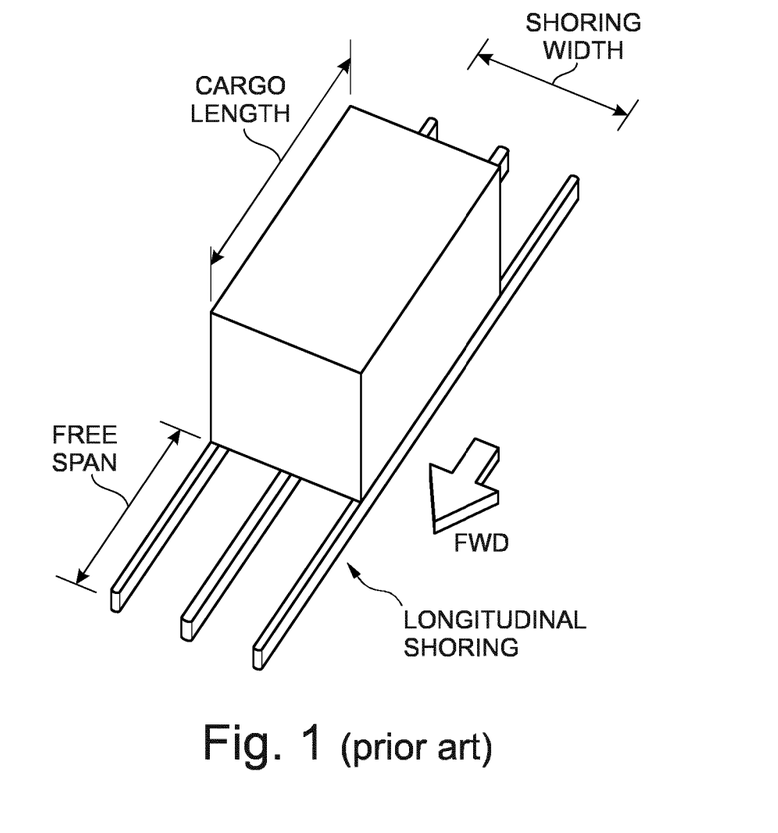
FIG. 1 schematically illustrates the principle of free span shoring according to the prior art.
Figure 2:
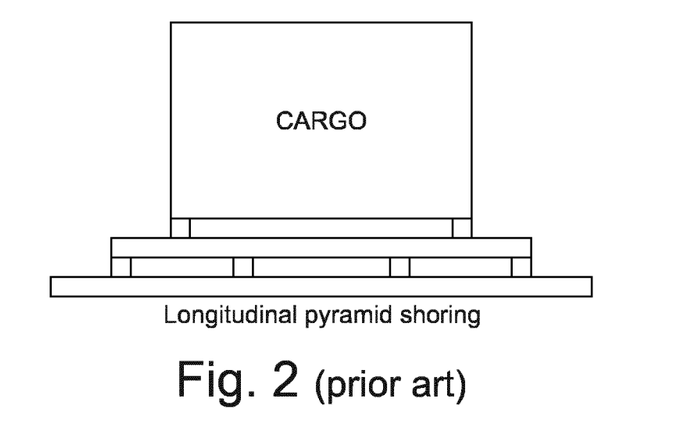
FIG. 2 schematically illustrates the principle of free span shoring according to the prior art.

In these documents, two main methods are described as effective ways of spreading the weight over a greater surface, and thus keeping the resulting aircraft floor loads within the limitations specified by the airframers AFM (aircraft flight manual): Free span shoring (ARP5596: chapter 4.3) (see also FIG. 1) and Pyramid shoring (ARP5596: chapter 5.3) (see also FIG. 2).

The free span shoring methods basically consist in locating the concentrated load on an arrangement of adequate stiffness materials providing a larger base in order to better distribute the total load over a larger area. The critical parameter in achieving this result is the total stiffness of the materials used, expressed as an EI value in lb×in² (N×cm²), where:
E is the Young modulus of the material, in lb/in² or N/cm²
I is the vertical moment of inertia of the individual piece of material", in cm⁴

The calculation method takes into account that the aircraft's floor structure is elastic and the fundamental parameter for computing any free span shoring arrangement is the floor's elasticity factor, which can be obtained only from the aircraft's manufacturer. The fundamental equations to be used for such computation are those for finite length beams on elastic foundations [source of equations in SAE document: "Formulas for stress and strain", Roark & Young, 1985, © McGraw Hill Inc. Publishers (section 7.5, Beams on elastic foundations)].

The main factor that influences the effectiveness of a shoring arrangement is given by:

$$\beta = \left(\frac{K}{4EI}\right)^{1/4}$$

where K represents an aircraft floor elasticity factor $$\left(\frac{lb}{in^2}\right)$$

an EI represents the shoring material stiffness (lb×in²)

The calculation method solves β by determining the minimum EI, whilst K is a given constant depending on aircraft type and floor section.

When the load is heavy and concentrated enough to require an impractical (freespan) shoring arrangement, pyramid shoring is a technique which allows enlarging the bearing length of the load, making it in fact equivalent to a longer one, in order to reduce primary shoring requirements.

The freespan shoring and the pyramid shoring both require to create customized solutions for each individual heavy shipment, leading to:
Long lead times required, due to required engineering calculation
High costs (material+manhours)
Not re-usable It is therefore desirable to provide an improved shoring adapter which enables to reduce at least some of the above shortcomings.

SUMMARY

In order to reduce the abovementioned shortcomings, the present disclosure provides a shoring adapter configured for spreading cargo loads, in particular heavy cargo loads, to be loaded on board of a transport aircraft, which comprises at least one base portion configured to be placed on a standardized aircraft cargo pallet and a cargo adapter portion configured to accommodate the cargo load, wherein in operation the cargo adapter portion is mounted on top of said at least one base portion.

According to an important aspect of the disclosure, the at least one base portion comprises a lower frame assembly, an upper frame assembly and at least one elastic support assembly, said at least one elastic support assembly being arranged between said lower frame assembly and said upper frame assembly such that, in operation, said upper frame assembly is elastically supported in a vertical direction by said at least one elastic support assembly on said lower frame assembly. It will be appreciated that, in order to be able to elastically support the upper frame assembly in a vertical direction, the elastic support assembly arranged between said lower frame assembly and said upper frame assembly should have a substantially higher flexibility in the vertical direction than both the lower and upper frame assembly.

The main characteristic of the present disclosure is thus that it uses "elastic shoring", a new method of spreading weight on elastic foundations. This new method of shoring does neither rely on "freespan shoring" nor on "pyramidal shoring" but can be considered as a third method that is not covered by the current aviation industry documents.

The method uses the theory of elastic foundations given by e.g. Roark & Young, 1985, but by solving the equation in a different manner than for traditional freespan shoring. For a specific cargo weight, cargo length, shoring length, the solution to the equation is given as:

$$\beta = \left(\frac{K}{4EI}\right)^{1/4}$$

In the traditional freespan shoring, the required shoring material stiffness is given by EI, while K is a constant and represents the aircraft floor stiffness. Due to the nature of the elastic floor, a stiffer floor leads to higher shoring requirements, while a more elastic floor, because it allows easier bending, allows higher loads to be redistributed into the shoring skid on the aircraft floor. Due to the upper frame assembly being elastically supported in a vertical direction by said at least one elastic support assembly, the K-value is not considered to be a constant given by the airframers, but it is considered it to be an adjustable variable, just like EI and that it also depends on the shoring skid properties.

The idea of elastic shoring includes creating series of elastic floors and stiff shoring material to create more effective ways of load-spreading than currently in use in commercial aviation. The resulting value of $K_{total}$ can be computed as $$\frac{1}{K_{total}} = \frac{1}{K_{aircraft\ floor}} + \frac{1}{K_{spring\ support}}$$

Thus for a constant coefficient β, if the value of K increases the value of EI may be reduced and thus the requirements for EI drop, thereby allowing a more efficient load distribution as e.g. classic freespan shoring. Furthermore, the reduction of the required lower frame stiffness allows reducing the total height of the required shoring, allowing higher cargo to be flown on commercial aircraft.

In a possible embodiment, the shoring adapter may comprise at least two base portions, each configured to be placed on a standardized aircraft cargo pallet, wherein said at least two base portions are arranged adjacent to one another, and wherein in operation said cargo adapter portion is mounted on top of said at least two base portions. In such an embodiment, the cargo adapter should be configured so as to span over both base portions. With this embodiment, cargo load may be distributed over two cargo pallets, which are e.g. to be arranged adjacent one another in longitudinal direction of the plane, thus enabling fulfillment of the shoring requirements for heavier loads.

In embodiments of the disclosure, said lower frame assembly of a base portion comprises at least two pairs of lower beams, each pair of lower beams comprising a first lower beam and second lower beam arranged at a certain distance from each other and extending generally in a first direction, and wherein said at least one elastic support assembly comprises one or more flexible support plates extending between and mounted on said first lower beam and said second lower beam, wherein said upper frame assembly comprises at least one upper beam associated which each of said at least two pairs of lower beams, said at least one upper beam generally extending in said first direction, wherein in operation, the arrangement is such that said at least one upper beam associated which each of said at least two pairs of lower beams rests on and is supported by one or more of said flexible support plates. It will be noted that the upper beam may have dimensions different from the dimensions of lower beams. The upper beam may e.g. be smaller in cross section or shorter than the lower beam. In other embodiments, the upper beam may have larger dimensions than the lower beams.

In order to implement the concept of creating series of elastic floors and stiff shoring material as introduced above, the lower beams and/or upper beams preferably have a high material stiffness compared to said flexible support plates.

In a preferred embodiment, the lower beams and/or the upper beams are steel beams having a H-shaped cross-section with a vertical web and two horizontal flanges. The flexible support plates are preferably steel spring plates secured to the respective lower steel beams. The steel spring plates may e.g. be secured by any possible mounting technique providing sufficient strength for bearing the required load. Preferably the steel spring plates are e.g. welded to the respective lower beams. It will be appreciated, that in order to enable the required elastic deformation in vertical direction, the steel spring plates may be secured to upper flanges of the respective lower beams. However in view of a reduced overall height of the base portion, the steel spring plates are preferably secured to a lower part of the vertical web section of the respective lower beams.

It will be appreciated, that the length and the width of a lower frame assembly are preferably adapted to the respective dimensions of a standardized aircraft cargo pallet, such that the length and width of the lower frame assembly are substantially equal to or smaller than the respective dimensions of the standardized aircraft cargo pallet. In case of the preferred embodiment described above, the length of the lower beams is advantageously adapted to the length of the respective cargo pallet. Regarding the width of the base portion, it will be appreciated that the at least two pairs of lower beams are not rigidly connected to each other so that the two pairs may be freely placed on the cargo pallet. The skilled person will of course understand that the two pairs of lower beams may e.g. preferably be placed adjacent to the lateral borders of the cargo pallet and thus the shoring adapter may easily adapt to different pallet widths.

In a preferred embodiment of the disclosure, the cargo adapter portion is removably mounted on top of the upper frame assembly of said at least one base portion. Since the cargo load on the shoring adapter will be later secured by one or more cargo nets or straps, the cargo adapter portion may e.g. be simply placed on top of the upper frame assembly. The respective contact surfaces on the upper frame assembly and on the cargo adapter may in this case advantageously be structured (e.g. be provided with corresponding interlocking structures) so that a gliding of the surfaces with respect to one another is prevented. Alternatively the cargo adapter may be removably fastened to the upper frame assembly by suitable fastening means such as bolts or locking pins or the like. It will be appreciated that the removable mounting of the cargo adapter portion enables the disassembly of the shoring adapter if the device is not in use and thus allows to rearrange the different elements of the shoring adapter into a stacked unit. This stacked unit will advantageously reduce the space needed to transport the adapter back to the starting point, i.e. on the return leg after the cargo load is delivered at its destination.

In possible embodiments, the cargo adapter portion comprises at least two adapter beams, said adapter beams being configured and arranged for, in operation, resting on and being supported by said upper frame assembly of said at least one base portion or resting on and being supported by said upper frame assemblies of said at least two base portions. The cargo adapter portion may e.g. comprise at least two adapter beams, each said adapter beam being configured and arranged for, in operation, resting on and being supported by said at least one upper beam associated which each of said at least two pairs of lower beams of said upper frame assembly of one of said at least one base portion. The adapter beams are designed to accommodate and support the cargo load and to distribute the weight of the cargo load onto the different upper beams.

The adapter beams will usually extend in the first direction, i.e. the same direction as the lower beams. In case of a cargo load with high dimensions and weight, where the shoring adapter comprises said at least two base portions are arranged adjacent to one another in said first direction, the at least two adapter beams may extend in said first direction and be configured and arranged for, in operation, resting directly on and being supported by said at least one upper beam associated which respective ones of said at least two pairs of lower beams of said upper frame assembly of said at least two base portions are arranged adjacent to one another in said first direction. In this case the distance between the two adapter beams thus corresponds to the distance between the upper beams of the base portion. By this arrangement, the weight of the cargo load is advantageously distributed over the two base positions, thus enabling to respect the shoring requirements even for high loads.

In case of a smaller sized cargo, the two adapter beams are advantageously arranged closer together so that a distance between the two adapter beams is smaller than the distance between the upper beams of the base portion. In this case, the cargo adapter may comprise further auxiliary beams, said auxiliary beams extending in a second direction transverse to said first direction, said auxiliary beams being arranged in operation between said upper beams of said base portion and said adapter beams so as to extend between the upper beams associated which each of said at least two pairs of lower beams of said upper frame assembly of a respective base portion. The position of the adapter beams is in this case adaptable to the cargo load, the weight being distributed via the adapter beams and the auxiliary beams into the upper beams of the base portion.

It will be appreciated that the exact position of the different beams of the cargo adapter portion or the base portion on their respective support may be easily adapted to the dimensions of the cargo load to be transported. The distance between respective beams is for instance easily adapted to a length or a width of the cargo load. The modular structure of the shoring adapter allows to adapt the shoring adapter easily to very different cargo loads, thus reducing the costs and time for shoring a cargo load compared to the traditional customized solutions. The present disclosure therefore proposes a versatile shoring adapter which is well suited for accepting random cargo, i.e. cargo with a very large range of dimensions in all directions.

It will be appreciated that the shoring adapter according to the present disclosure reduces to a maximum extend the necessary skid stiffness and optimizes load distribution, thus allowing transportation of denser cargo than with traditional shoring methods while still meeting the aircraft limitation requirements. The embodiments of the cargo adapter further allow for Easy adaptation to the cargo on-hand (all parts moveable, lockable e.g. with pins)

Splitting of the skid structure into two dividable units, while traditional freespan shoring skids require a single continuous skid that is longer than the piece of cargo Disassembly of the shoring adapter allows the adapter to be returned back to base as a stacked unit (loosing less space on the return leg)

Combining several cargo adaptors to transport longer (and even heavier) cargo

Even out load distribution during loading/offloading on multiple highloaders (in contrast to traditional freespan shoring), as the adaptor in combination with the split elastic shoring, acts as an hinge distribution the load in case of non-leveled highloaders It will be noted that the present disclosure also relates to a method for using a shoring adapter as described in embodiments above. The method comprises the steps of placing two pairs of lower beams on a standardized aircraft cargo pallet such that one pair of lower beams extends substantially parallel with each one of two opposing borders of said standardized aircraft cargo pallet, placing the respective upper beams on said one or more flexible support plates extending between and mounted on said lower beams of each pair of lower beams, mounting the cargo adapter on top of said upper beams and placing a cargo load on said cargo adapter.

It will be noted that the step of mounting the cargo adapter on top of said upper beams comprises the step of adapting a size and or position of the cargo adapter to the dimensions of the cargo load to be accommodated.

BRIEF DESCRIPTION OF THE DRAWINGS

Further details and advantages of the present disclosure will be apparent from the following detailed description of not limiting embodiments with reference to the attached drawing, wherein.

DETAILED DESCRIPTION OF THE DRAWINGS

Figure 5:
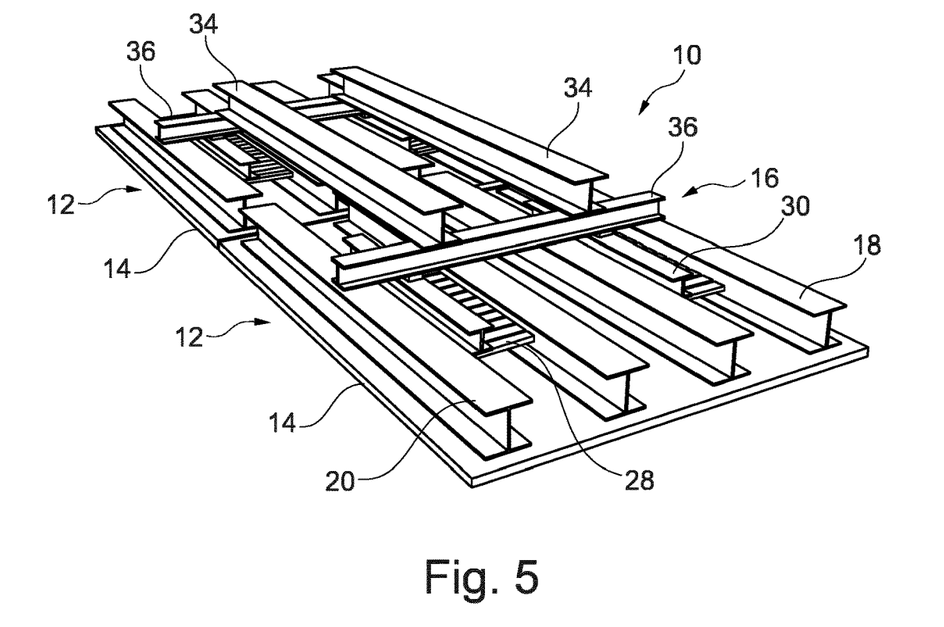
FIG. 5 shows a perspective view of an embodiment of the shoring adapter.

An embodiment of a shoring adapter 10 in accordance with the present disclosure is shown in FIG. 5. The shown adapter comprises two base portions 12, each placed on and supported by a respective standardized cargo pallet 14. The standardized cargo pallet 14 may be provided in standardized pallet sizes of common length and width, which may correspond to standardized positions on an aircraft cargo compartment floor where freight containers or pallets may fit.

A cargo adapter 16 is placed on top of and supported by the two base portions 12, such that one end of the cargo adapter is supported by the first base portion and the other end of the cargo adapter is supported by the second base portion.

Figure 3:
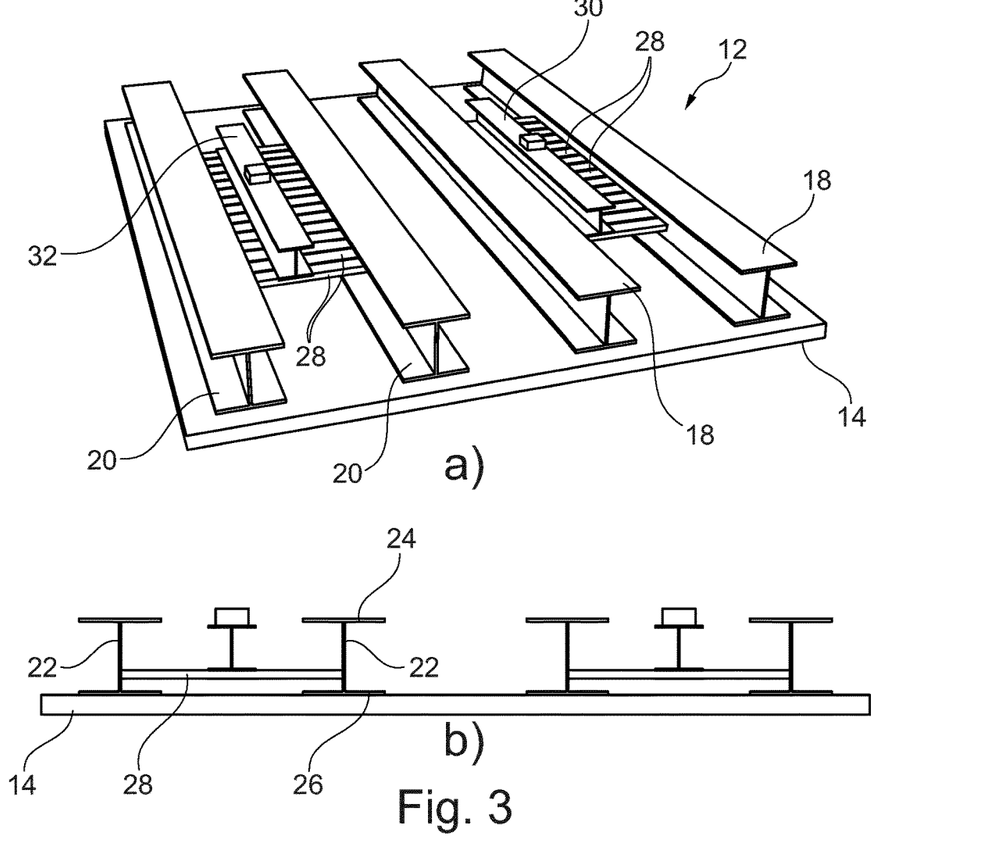
FIG. 3 shows different views on an embodiment of the base portion of a shoring adapter.

The configuration of the respective base portions 12 is shown in more detail in FIG. 3, which shows a perspective view of an embodiment of a base portion in a) and a cross section of the base portion in b).

The base portion 12 includes a lower frame assembly comprising a number of lower beams 18 and 20 arranged in pairs on the cargo pallet 14. The lower beams 18 and 20 are represented to have an H-shaped cross-section with a vertical web 22 and two horizontal flanges 24 and 26 (see also FIG. 3b)) but it will be understood that the beams may have any other configuration suitable for providing the required stiffness to the structure.

A plurality of flexible support plates 28, e.g. steel spring plates 28, are secured to the respective lower steel beams 18 or 20. The steel spring plates may e.g. be secured by any possible mounting technique providing sufficient strength for bearing the required load. Preferably the steel spring plates 28 are e.g. welded to the respective lower beams 18 of 20. The steel spring plates, which are elastically deformable in vertical direction, form together an elastic support assembly on which upper beams 30 and 32 may be mounted and elastically supported in a vertical direction.

It will be appreciated, that in order to enable the required elastic deformation in vertical direction, the steel spring plates may be secured to the upper flanges 24 of the respective lower beams 18 or 20. However in view of a reduced overall height of the base portion 12, the steel spring plates 28 are preferably secured to a lower part of the vertical web section 22 of the respective lower beams 18 or 20 as shown in FIG. 3b).

The cargo adapter portion 16 will be mounted onto the base portion 12 so that the load of the cargo adapter and the cargo itself rests on the respective upper beams 30 and 32 thereby resulting in an elastic shoring of the load due to the elastic support provided by the steel spring plates 28.

As disclosed above, the main characteristic of the present disclosure is thus that it uses "elastic shoring", a new method of spreading weight on elastic foundations. This new method of shoring does neither rely on "freespan shoring" nor on "pyramidal shoring" but can be considered as a third method that is not covered by the current aviation industry documents.

The method uses the theory of elastic foundations given by e.g. Roark & Young, 1985, but by solving the equation in a different manner than for traditional freespan shoring. For a specific cargo weight, cargo length, shoring length, the solution to the equation is given as:

$$\beta = \left(\frac{K}{4EI}\right)^{1/4}$$

In the traditional freespan shoring, the required shoring material stiffness is given by EI, while K is a constant and represents the aircraft floor stiffness. Due to the nature of the elastic floor, a stiffer floor leads to higher shoring requirements, while a more elastic floor, because it allows easier bending, allows higher loads to be redistributed load into the shoring skid on the aircraft floor.

Due to the upper beams 30 and 32 being elastically supported in a vertical direction by the steel spring plates 28, the K-value is not considered to be a constant given by the airframers, but it is considered it to be an adjustable variable, just like EI and that it also depends on the shoring skid properties.

The idea of elastic shoring includes creating series of elastic floors and stiff shoring material to create more effective ways of load-spreading than currently in use in commercial aviation. This working principle is illustrated schematically in FIG. 4. The resulting value of $K_{total}$ can be computed as $$\frac{1}{K_{total}} = \frac{1}{K_{aircraft\,floor}} + \frac{1}{K_{spring\,support}}$$

Thus for a constant coefficient β, if the value of K increases the value of EI may be reduced and thus the requirements for EI drop, thereby allowing a more efficient load distribution as e.g. classic freespan shoring.

Figure 4:
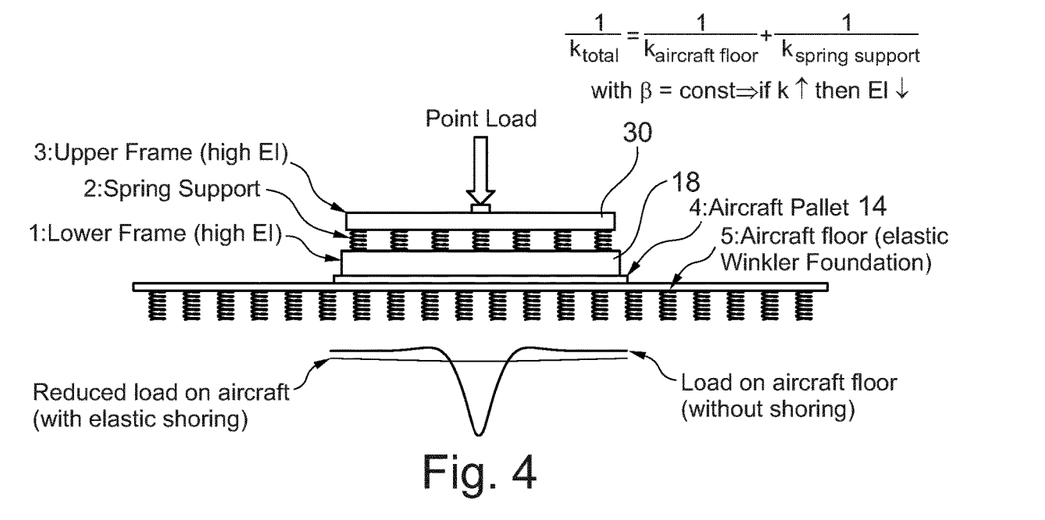
FIG. 4 illustrated the principle of "elastic shoring" and the impact on the load distribution on the aircraft floor.

The working principle of the elastic shoring is shown in FIG. 4. It shows that with the variation of K, the requirements for EI drop, thus allowing a more efficient load distribution as e.g. classic freespan shoring.

As an example: In the case of transporting a very short (<50 cm length) and very heavy (25.000 kg) cargo on a Boeing B747-400F main deck, wingbox section, with a floor elasticity of 0.3285 kg/cm³, translating into 80.15 kg/cm² for a typical PGF pallet (606×244 cm), a traditional steel shoring base with an Young's Modulus of approx. 111,000 cm⁴ would be required to limit the resulting floor deflection to the maximum allowed value of 0.5945 cm.

Using the depicted elastic shoring principle in FIG. 4 with a first layer (3) "Upper Frame" of two steel beams (HEA260) with an Young's modulus of 10,450 cm⁴, length 400 cm, placing it onto equidistantly spaced springs (steel plates, dimensions 8×2.5×66 cm, k=3,580 kg/cm) every 10 cm, the resulting steel shoring base (1) "Lower Frame" only requires an Young's modulus of 76,000 cm⁴ to limit the resulting floor deflection to the maximum allowed value of 0.5945 cm.

This ultimately means that the principle of elastic shoring, used in the above example on a B747-400F allows reducing the shoring skid stiffness, which is in direct contact with the floor, by a factor of 44%.

The total skid stiffness can be reduced by the same ratio than the new, total (respective applicable) floor elasticity, given by the equation on FIG. 4; in the case of the given example the total skid stiffness could be reduced by 20% (detailed results depend on stiffness of the upper frame, better results—respective higher reduction ratios to be obtained with higher upper frame stiffness).

The reduction of the required lower frame stiffness allows to reduce the total height of the required shoring (due to the interposed beams (3) and (4) by 12%

$$\left(I_{y\,Typical} = \frac{b*h^3}{12} \Rightarrow h = const * I_y^{\frac{1}{3}}\right),$$

allowing taller cargo to be flown on commercial aircraft.

Combining the principle of elastic shoring with the "pyramid" technic of the below described cargo adapter allows a further reduction of the required stiffness as it allows spreading the initial load onto the elastic shoring even further. The current design of the shoring adapter has a maximum capacity of around 25,000 kg, the ultimately required stiffness of layer (1) "Lower Frame" can be reduced to 4,500 cm⁴ (representing a reducing factor of 26) by combining both principles.

Figure 6:
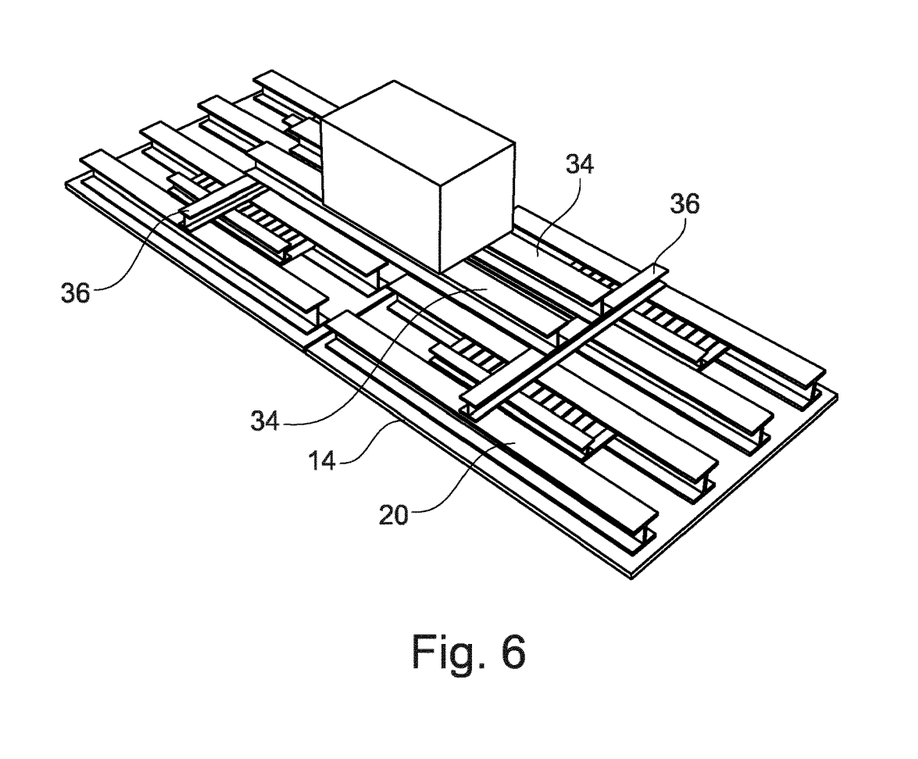
FIGS. 6 and 7 show possible configurations of the shoring adapter for different cargo loads.

As can be seen from FIG. 5, the cargo adapter 16 comprises a number of adapter beams 34, which are configured to be supported (directly or indirectly) by the upper beams 30 and 32 of the base portion. In the embodiment shown in FIG. 5, the auxiliary beams 36 extending in a direction transverse to the upper beams 30 and 32 are arranged between the upper beams 30, 32 and the adapter beams 34. The lateral position of the adapter beams 34 on these auxiliary beams 36 is chosen so as to adapt the distance between the adapter beams 34 to the respective cargo to be transported. FIG. 6 shows for instance the situation of a small sized heavy load cargo, in which the two adapter beams 34 are arranged close together in order to accommodate the small sized cargo. The weight is in this embodiment distributed via the adapter beams 34 and the auxiliary beams 36 into the upper beams 30, 32 of the base portion.

Figure 7:
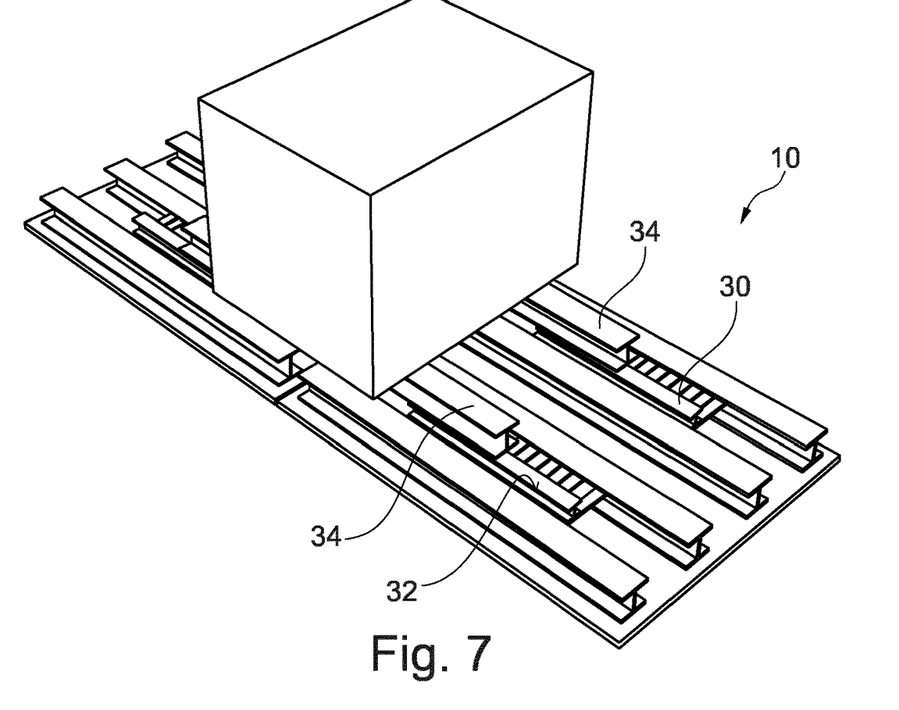

FIG. 7 shows the configuration of the shoring adapter 10 in the presence of a cargo having an extended size so that the distance between the two adapter beams 34 is increased compared to the respective distance as shown in FIG. 6. The configuration is such that the distance between the two adapter beams 34 corresponds to the distance between the upper beams 30, 32 of the base portion. In this case, the auxiliary beams 36 are not required and the adapter beams 34 may rest directly on the respective upper beams 30, 32.

It will be noted, that in order to implement the concept of creating series of elastic floors and stiff shoring material as introduced above, the lower beams 18 and 20 and/or upper beams 30 and 32 preferably have a high material stiffness compared to said flexible support plates 28. The different beams (lower beams 18 and 20, upper beams 30 and 32, adapter beams 34 and auxiliary beams 36) of the cargo adapter may e.g. be made of steel and have a H-shaped cross-section with a vertical web and two horizontal flanges. These steel profiles are known to have a high stiffness and thus easily fulfill shoring requirements. The skilled person will of course be aware that also other beam forms or profiles are perfectly adequate to fulfill the requirements.

It will also be apparent from the embodiments shown in the figures, that the dimension of the different beams may be adapted to their specific role in the shoring adapter and that accordingly the different beam types may have different dimensions (length, height, width). The length of the lower beams 18, 20 is e.g. preferably adapted to the respective dimensions of a standardized aircraft cargo pallet 14.

Figure 8:
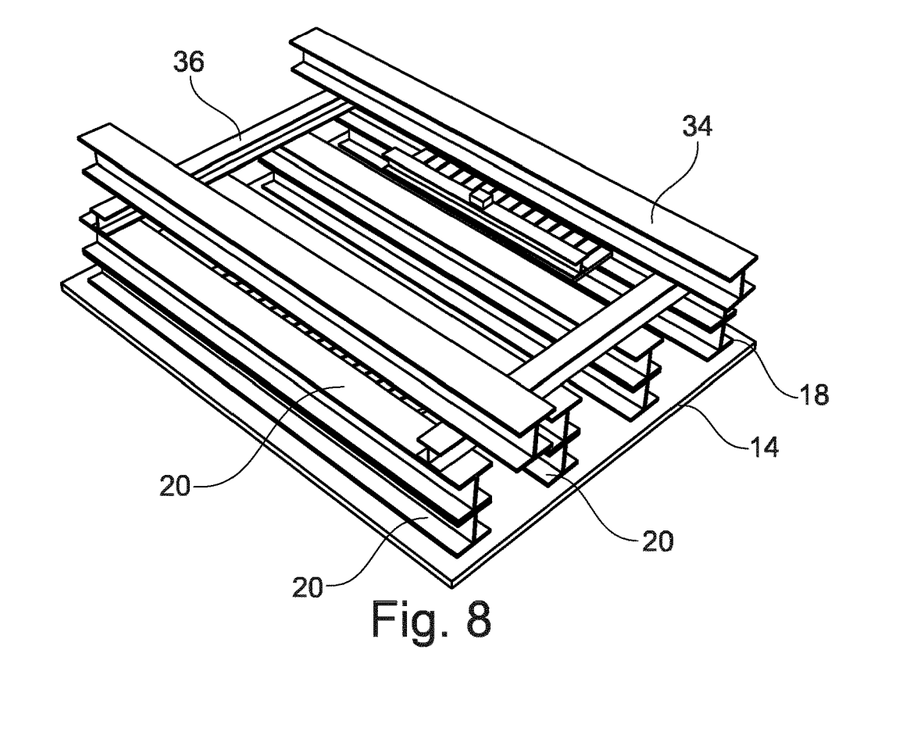
FIG. 8 shows the shoring adapter in its disassembled and stacked configuration if the adapter is not in operation.

It will be appreciated that the cargo adapter portion is preferably removably mounted on the upper beams 30, 32. The cargo adapter is e.g. fastened to the upper frame assembly by suitable removable fastening means such as bolts or locking pins or the like. The removable mounting of the cargo adapter portion 16 enables the disassembly of the shoring adapter 10 if the device is not in use and thus allows to rearrange the different elements of the shoring adapter into a stacked unit. This is e.g. represented in FIG. 8, where two base portions and a cargo adapter are compactly stacked on a single transport pallet 14. This stacked unit will advantageously reduce the space needed to transport the adapter back to the starting point, i.e. on the return leg after the cargo load is delivered at its destination.

The invention claimed is:

1. A shoring adapter configured for spreading cargo loads to be loaded on board of a transport aircraft, said shoring adapter comprising: at least one base portion configured to be placed on a standardized aircraft cargo pallet and a cargo adapter portion configured to accommodate a cargo load, wherein in operation said cargo adapter portion is mounted on top of said at least one base portion, wherein said at least one base portion comprises a lower frame assembly, an upper frame assembly, and at least one elastic support assembly, said at least one elastic support assembly being arranged between said lower frame assembly and said upper frame assembly such that, in operation, said upper frame assembly is elastically supported in a vertical direction by said at least one elastic support assembly on said lower frame assembly, wherein said lower frame assembly of a base portion comprises at least two pairs of lower beams, each pair of lower beams comprising a first lower beam arranged at a distance from a second lower beam and extending generally in a first direction, and wherein said at least one elastic support assembly comprises one or more flexible support plates extending between and mounted on said first lower beam and said second lower beam, wherein said upper frame assembly comprises at least one upper beam associated with each of said at least two pairs of lower beams, said at least one upper beam generally extending in said first direction, wherein in operation, the arrangement is such that said at least one upper beam associated with each of said at least two pairs of lower beams rests on and is supported by one or more of said flexible support plates.

2. The shoring adapter according to claim 1, comprising at least two base portions configured to be placed on a standardized aircraft cargo pallet, wherein said at least two base portions are arranged adjacent to one another, and wherein, in operation, said cargo adapter portion is mounted on top of said at least two base portions.

3. The shoring adapter according to claim 1, wherein said lower beams or said at least one upper beams have a high material stiffness compared to said flexible support plates.

4. The shoring adapter according to claim 1, wherein said lower beams or said at least one upper beams are steel beams having an H-shaped cross-section with a vertical web and two horizontal flanges and wherein said flexible support plates are steel spring plates secured to the vertical webs of the respective lower beams.

5. The shoring adapter according to claim 1, wherein a length and a width of said lower frame assembly are adapted to the respective dimensions of a standardized aircraft cargo pallet, such that the length and width of the lower frame assembly are substantially equal to or smaller than the respective dimensions of the standardized aircraft cargo pallet.

6. The shoring adapter according to claim 1, wherein in operation, said cargo adapter portion is removably mounted on top of the upper frame assembly of said at least one base portion.

7. The shoring adapter according to claim 2, wherein said cargo adapter portion comprises at least two adapter beams, said at least two adapter beams being configured and arranged for, in operation, resting on and being supported by said upper frame assembly of said at least one base portion or resting on and being supported by two upper frame assemblies of said at least two base portions.

8. The shoring adapter according to claim 1, wherein said cargo adapter portion comprises at least two adapter beams, each of said at least two adapter beams being configured and arranged for, in operation, resting on and being supported by said at least one upper beam associated with each of said at least two pairs of lower beams of said upper frame assembly of one of said at least one base portion.

9. The shoring adapter according to claim 8, wherein said adapter beams extend in a first direction and wherein said cargo adapter portion further comprises auxiliary beams extending in a second direction transverse to said first direction, said auxiliary beams being arranged in operation between said upper beams of said base portion and said adapter beams so as to extend between the upper beams associated with each of said at least two pairs of lower beams of said upper frame assembly of one of said at least one base portion.

10. The shoring adapter according to claim 7, wherein said at least two base portions are arranged adjacent to one another in a first direction and wherein said at least two adapter beams extend in said first direction and wherein said adapter beams are configured and arranged for, in operation, resting on and being supported by said at least one upper beam associated with each of said at least two pairs of lower beams of said upper frame assembly of said at least two base portions are arranged adjacent to one another in said first direction.

11. A method for using a shoring adapter according to claim 1, including the following steps:

placing two pairs of lower beams on said standardized aircraft cargo pallet such that one pair of lower beams extends substantially parallel with each one of two opposing borders of said standardized aircraft cargo pallet, placing the at least one upper beam associated with each of said at least two pairs of lower beams on said one or more flexible support plates extending between and mounted on said first and second lower beams of each pair of lower beams, and mounting the cargo adapter portion on top of said at least one upper beams associated with each of said at least two pairs of lower beams and placing the cargo load on said cargo adapter portion.

12. The method according to claim 11, wherein the step of mounting the cargo adapter portion further includes the step of adapting a size or a position of the cargo adapter portion to the dimensions of the cargo load to be accommodated.

* * * * *